United States Patent
Gaertner

(10) Patent No.: US 6,679,183 B2
(45) Date of Patent: Jan. 20, 2004

(54) OVERHEAD CONVEYING APPARATUS, IN PARTICULAR FOR ITEMS HANGING ON HOOKS

(76) Inventor: Franz Gaertner, Muehlweg 10, 97656 Oberelsbach (DE)

( * ) Notice: Subject to any disclaimer, the term of this patent is extended or adjusted under 35 U.S.C. 154(b) by 0 days.

(21) Appl. No.: 10/178,051

(22) Filed: Jun. 21, 2002

(65) Prior Publication Data

US 2003/0015113 A1 Jan. 23, 2003

(30) Foreign Application Priority Data

Jun. 25, 2001 (DE) .......................... 201 10 455

(51) Int. Cl.⁷ .............................. B61B 3/00
(52) U.S. Cl. ........................ 104/89; 198/851
(58) Field of Search .................. 104/89, 91, 93, 104/96; 198/851, 845, 822; 160/166.1, 172, 173

(56) References Cited

U.S. PATENT DOCUMENTS

| | | | | |
|---|---|---|---|---|
| 1,914,967 A | * | 6/1933 | Bebb | 104/93 |
| 4,029,199 A | * | 6/1977 | Reens | 198/840 |
| 4,770,291 A | * | 9/1988 | Shaw | 198/851 |
| 5,323,834 A | * | 6/1994 | Toti | 160/84.04 |
| 5,456,182 A | * | 10/1995 | Neeman | 104/112 |
| 5,927,367 A | * | 7/1999 | Toti | 160/173 V |

* cited by examiner

Primary Examiner—S. Joseph Morano
Assistant Examiner—Lars A. Olson
(74) Attorney, Agent, or Firm—Goodman & Teitelbaum, Esqs.

(57) ABSTRACT

An overhead conveying apparatus, in particular for items hanging on hooks, having a conveying chain which is guided in a chain guide, the chain including chain studs which project laterally beyond chain flanges disposed on one side of the chain. Plate-like carrying elements are provided with holes for receiving the chain studs therethrough when the plate-like carrying elements have been pushed onto the chain studs. The carrying elements have a plate-like construction and are arranged one after the other on the chain. The carrying elements are provided with at least one opening or one cutout therethrough for accommodating a hook for the items.

14 Claims, 6 Drawing Sheets

OVERHEAD CONVEYING APPARATUS, IN PARTICULAR FOR ITEMS HANGING ON HOOKS

BACKGROUND OF THE INVENTION

The invention relates to an overhead conveying apparatus, in particular for items hanging on hooks.

DE 40 26 546 A1 discloses a conveying apparatus which is intended for items hanging on hooks, in particular items of clothing, in the case of which the items of clothing are conveyed along a rail on which the hooks rest. The hooks here are conveyed by a chain conveyor, the chain conveyor engaging in the running path of the hooks by way of conveying fingers and pushing said hooks by means of the fingers. The disadvantage of such an apparatus is that it requires a large amount of space and, in addition, is very complex and expensive to produce.

It is also known for items of clothing in particular to be transported in a state in which they hang on so-called trolleys, these trolleys being displaced along a rail on which they are retained in a hanging state by way of rollers.

BRIEF SUMMARY OF THE INVENTION

The object of the invention is to provide an overhead conveying apparatus which is of straightforward construction, is easy to assemble and maintain and easily conveys even over relatively narrow radii, it being possible for the conveyable items to have a small spacing between them and nevertheless being conveyed separately.

The object is achieved by an overhead conveying apparatus having the features set forth below.

According to the invention, at least some of the chain studs are formed on a transporting chain, guided in a corresponding transporting profile, such that they project laterally beyond the chain, the projecting ends being guided in part of the profile. Between the actual chain and the guide part for the ends of the projecting chain studs, plate-like conveying elements are pushed onto the chain studs and extend out of the conveying rail through a slot. The conveying elements here can be moved in relation to one another in each case, with the result that the movements of the chain can be followed well, even if the latter is guided around narrow radii.

In the case of such a conveying apparatus, it is advantageous for the latter to convey reliably, the apparatus being of straightforward construction and allowing items of clothing to be conveyed relatively closely together, but separately, it being possible for the plate-like elements in particular to be provided with correcting arrangements, with the result that the items, which are conveyed separately at a close spacing from one another, can also be separated in accordance with the coding for selection purposes.

Such an apparatus is particularly well-suited, in particular, for wardrobes in theatres, department stores or the like, where sorting and conveying operations have to be carried out reliably and quickly in an extremely confined amount of space even with narrow radii.

BRIEF DESCRIPTION OF THE SEVERAL VIEWS OF THE DRAWINGS

The invention will be explained by way of example with reference to a drawing, in which.

DETAILED DESCRIPTION OF THE INVENTION

Figure 1:
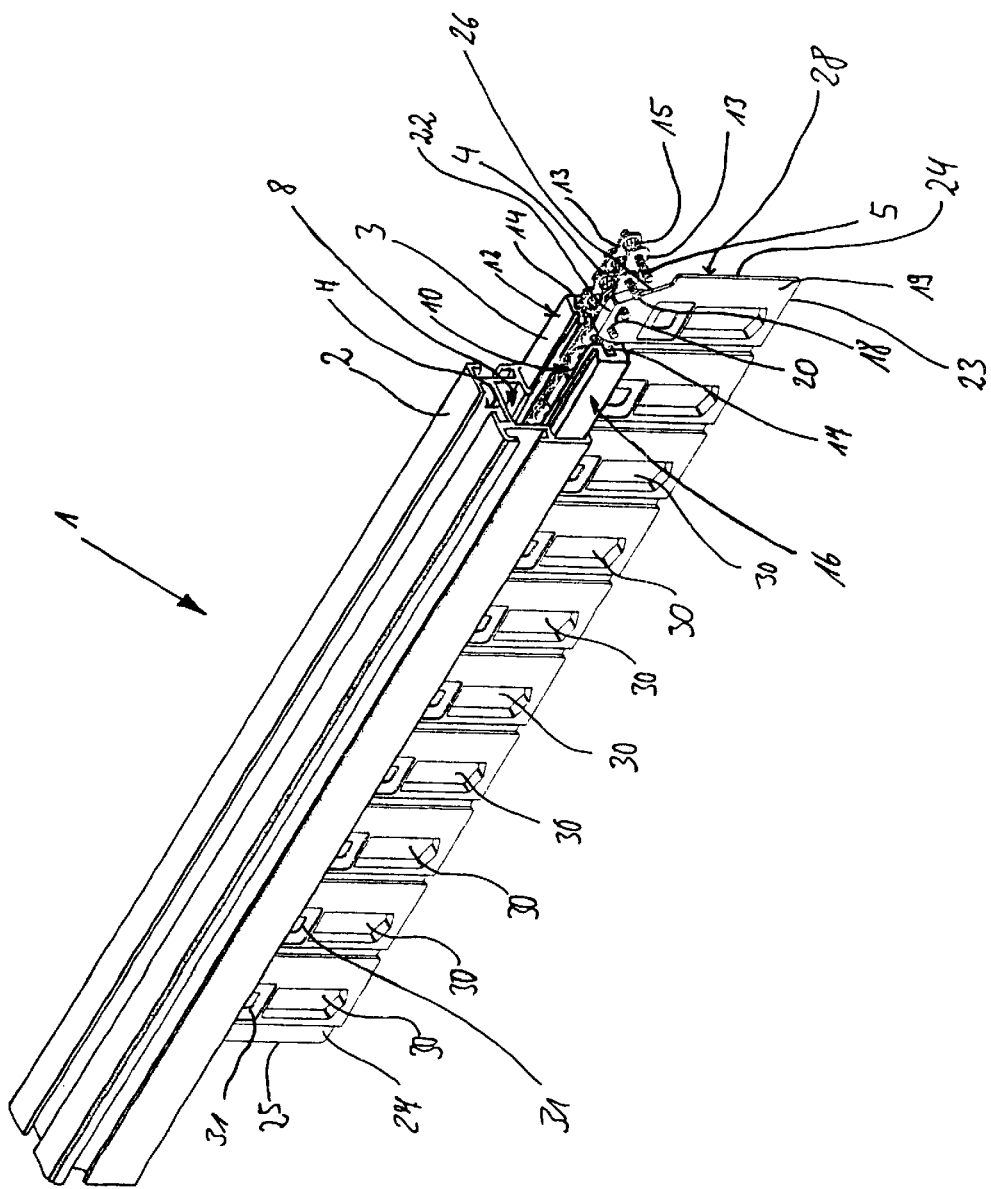
FIG. 1 shows a perspective, partly sectioned view of an overhead conveying apparatus according to the invention.
Figure 2:
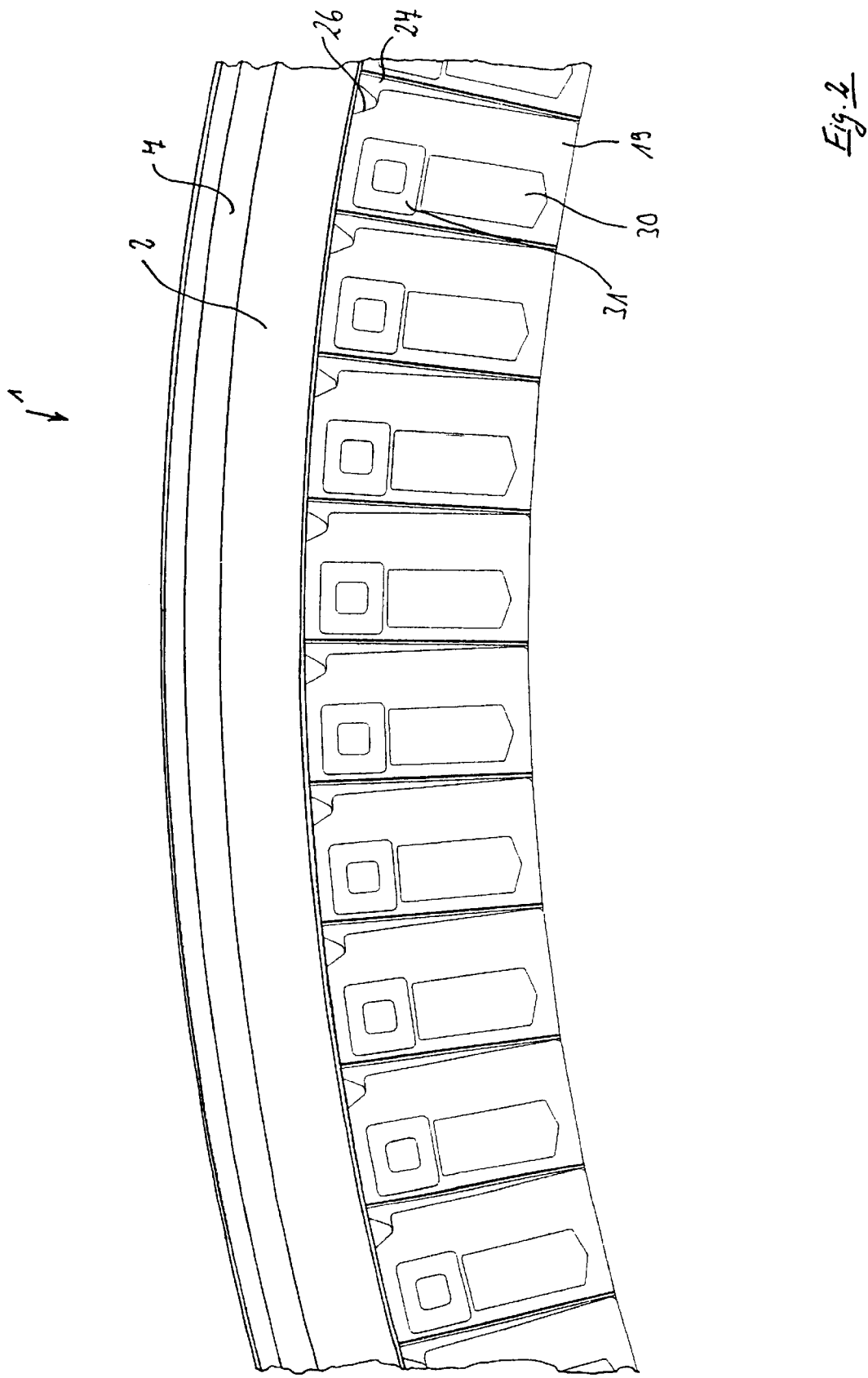
FIG. 2 shows an overhead conveying apparatus according to FIG. 1 in the region of a downwardly directed curved conveying section.
Figure 3:
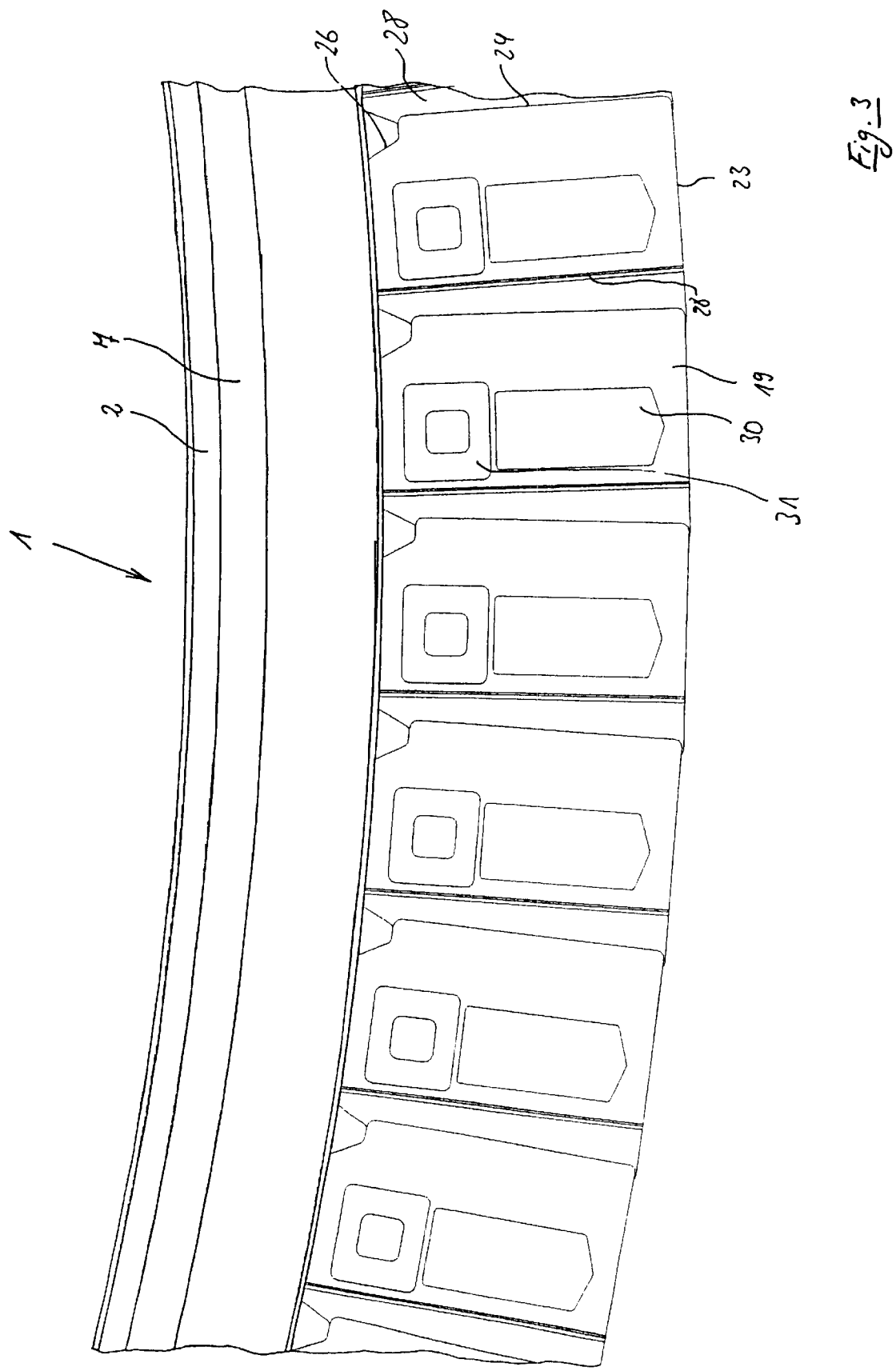
FIG. 3 shows an overhead conveying apparatus according to FIG. 1 in an upwardly directed conveying movement.

An overhead conveying apparatus 1 according to the invention has a conveying rail 2, a chain guide 3 which is arranged in the conveying rail 2, and a conveying chain 4.

The conveying rail 2 is designed as an elongate plastic or metal hollow profile, the conveying rail 2 being designed with grooves 7 on the outside for fastening the same on carrying structures.

The conveying rail 2, which is designed as a hollow profile, has a cavity 8 in the interior, said cavity being of, for example, flat rectangular design in cross section. The conveying rail 2 has an axial slot 9 in relation to the conveying direction or conveying operation.

The chain guide 3 is arranged in the cavity 8. The chain guide 3 is an elongate, essentially rectangular plastic or metal hollow profile, preferably plastic hollow profile, which has an outer contour which corresponds to the inner contour of the rail 2. The chain guide 3 is thus arranged essentially with a form fit in the conveying rail 2. The chain guide 3, in alignment with the slot 9, has a slot 10 which can extend through the chain guide 3 and subdivides the chain guide 3 into two profile halves 12, 16.

On one profile half 12 of the chain guide 3, the chain guide 3 has an inner or hollow contour which corresponds to the chain 4 which is to be guided, a vertical slot or groove 14 being provided for the flanges 13 of the chain 4 which are directed away from the slot 10 and a horizontal slot being provided between the slot 14 and slot 10, said horizontal slot having top and bottom crosspieces (which cannot be seen) on which the chain rollers 15 can roll. Introduced on the side 16, which is located diametrically opposite the profile guiding the chain 4, is a horizontal slot or a horizontal groove 17 in which the three ends 18 of the chain studs 5 are guided.

A free space is provided between the profile half 16 and the chain flanges 13 directed toward it, plate-like carrying elements 19 with holes 20—which correspond to the spacing between the studs 5—being arranged in a state in which they have been pushed onto the studs.

The carrying elements 19 are designed as essentially flat rectangular plates.

The carrying elements 19 thus have two mutually opposite narrow edges 22, 23 and two mutually opposite longitudinal edges 24, 25 connecting the latter. A narrow edge 22 extends to a longitudinal edge 24 by way of a slope 26 such that the edge 22 is approximately half the width of the edge 23. Arranged in the region of the edge 22 are the two holes 20, which have a spacing between them which corresponds to the stud spacing of the chain.

In the region of the longitudinal edges 24, 25, the transporting elements each have a groove or recess 27, 28 by means of which the plate-like elements are tapered approximately by half in cross section, the recesses 27, 28 being made in mutually opposite flat sides. In the assembled state, the plate-like carrying elements 19 hang on the chain studs such that the carrying elements 19 are arranged in an interengaging or overlapping manner in the region of the grooves 27, 28. The plate-like carrying elements 19 have in each case one essentially rectangular transporting opening 30 adjacent to an end edge 23, in the direction of the end wall 22, over approximately half their extent.

In each case one coding section 31 is provided between the openings 30 and the end edge 22. The coding sections 31. may have coding means (not shown). In the simplest case, the coding means may have stuck-on numbers. It is also possible for the coding means to comprise a barcode or the like, and it is further possible for the coding means to have an electronic component or the like which can be read in a contactless manner or by sensing contact. The overhead conveying apparatus has a corresponding read-out device and/or coding device for this purpose.

Figure 4:
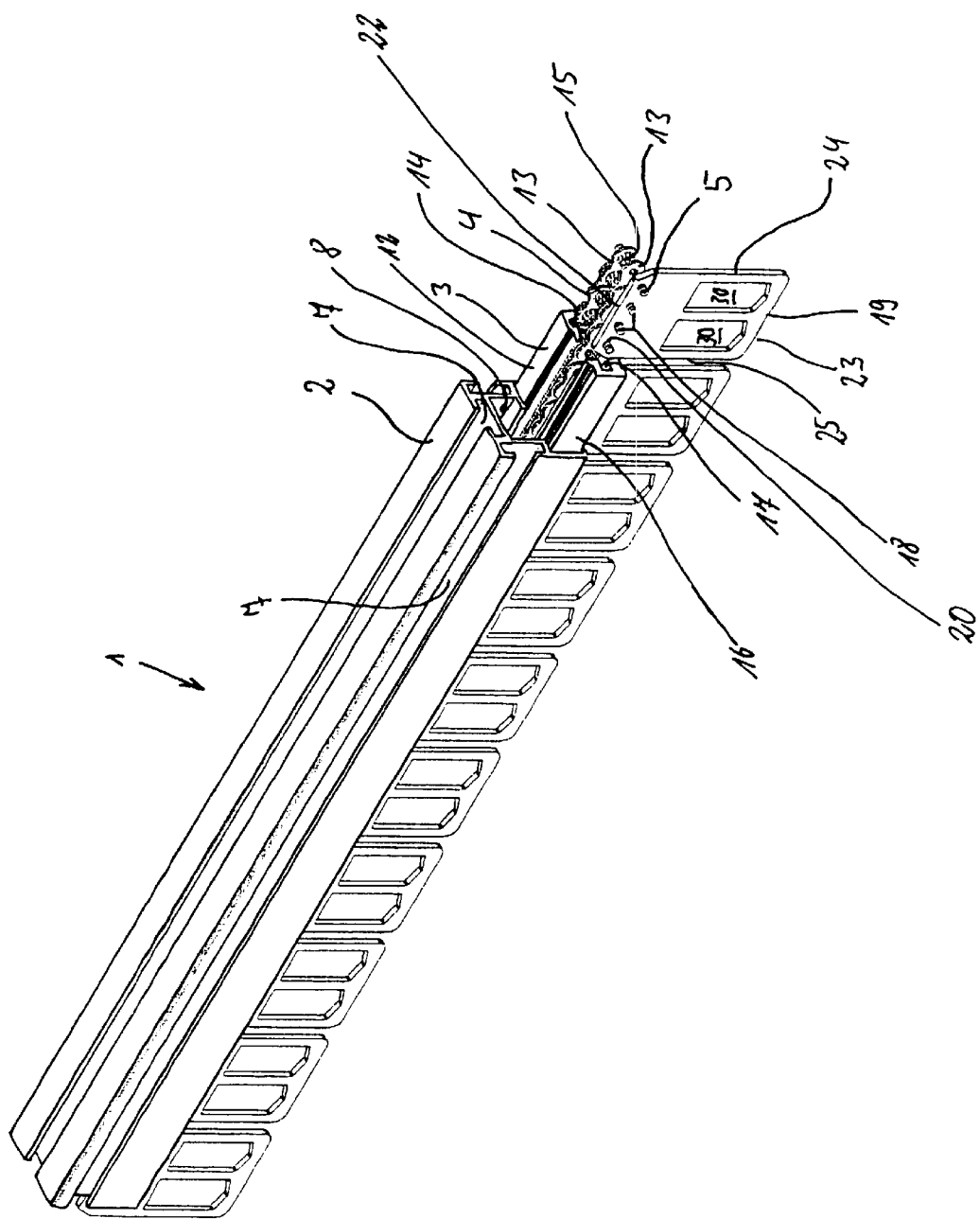
FIG. 4 shows a perspective, partly sectioned view of a further embodiment of the conveying apparatus according to the invention.
Figure 5:
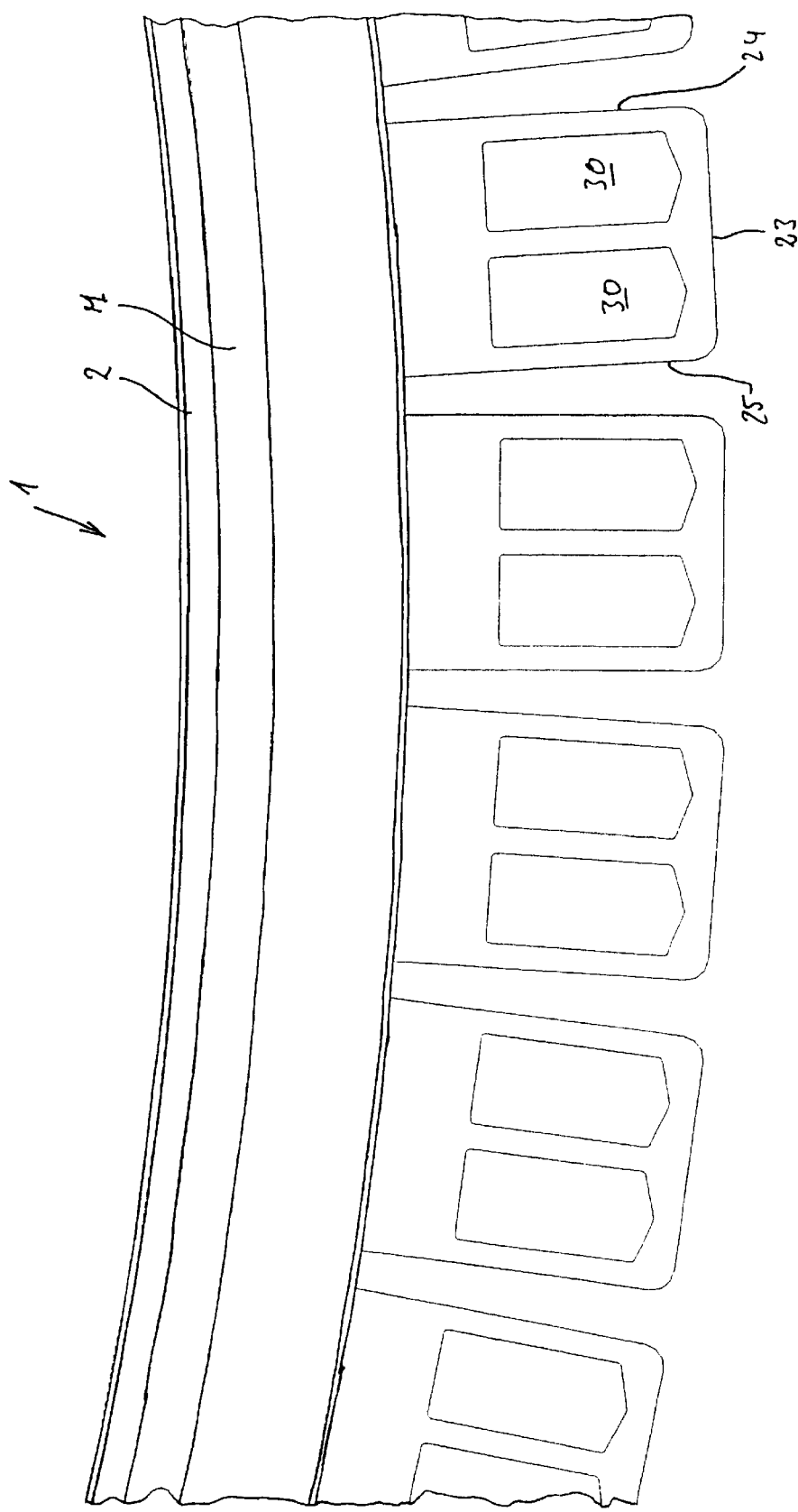
FIG. 5 shows the conveying apparatus according to FIG. 4 in an upwardly conveying section.
Figure 6:
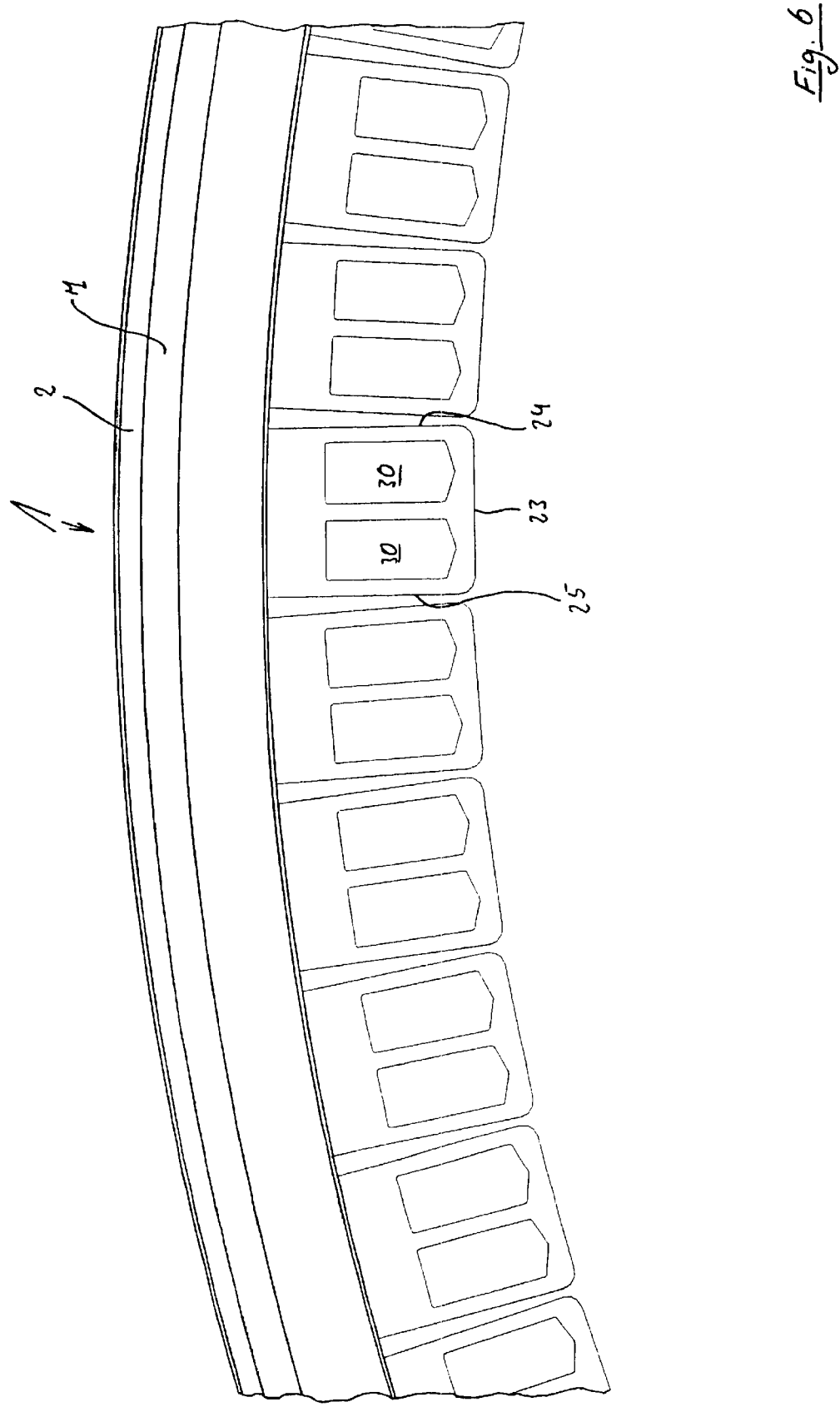
FIG. 6 shows the overhead conveying apparatus according to FIG. 4 in a downwardly conveying section.

In the case of a further embodiment of the invention (FIGS. 4 to 6), the plate-like carrying elements 19 are likewise of flat rectangular plate-like design, the plate-like carrying elements 19 here having no grooves and the end edge 22 having approximately the same width as the end edge 23. In this embodiment, four bores 20 for chain studs 5 are provided in the region of the end edge 22, the plate-like elements 19, following one after the other on the chain studs, being spaced apart from one another in each case by a chain-stud spacing and not being arranged in an interengaging manner. These elements 19 have two openings 30 which follow one after the other and, accordingly, are located one beside the other.

It is also possible for such plate-like elements 19 to have the corresponding coding devices.

What is claimed is:

1. An overhead conveying apparatus adapted for items hanging on hooks, comprising:

a conveying chain (4);

the chain (4) being guided in a chain guide (3);

the chain (4) including chain studs (5) so that the chain studs (5) project laterally beyond chain flanges (13) disposed on one side of the chain (4);

plate-like carrying elements (19) being provided with holes (20) for receiving the chain studs (5) therethrough when the carrying elements (19) have been pushed onto the chain studs (5);

the carrying element (19) having a plate-like construction and being arranged one after the other on the chain (4);

the carrying elements (19) being provided with at least one opening (30) or one cutout (30) therethrough for accommodating a hook for the items; and the chain guide (3) being arranged in a conveying rail (2), the conveying rail (2) being constructed as an elongate plastic or metal hollow profile.

2. The apparatus as claimed in claim 1, wherein the conveying rail (2) has a cavity (8) in an interior portion of the hollow profile, the conveying rail (2) having an axial slot (9) in relation to the conveying direction or conveying operation.

3. The apparatus as claimed in claim 2, wherein the chain guide (3) is arranged in the cavity (8), the chain guide (3) being an elongate, essentially rectangular plastic or metal hollow profile, which has an outer contour which is positioned with a force fit into an inner contour of the rail (2), the chain guide (3) being in alignment with the slot (9), and having a slot (10) extending into or through the chain guide (3) to subdivide the chain guide (3) into two profile halves (12, 16).

4. The apparatus as claimed in claim 3, wherein the chain guide (3), on one profile half (12), has an inner or hollow contour which essentially corresponds to the chain (4), a vertical slot or groove (14) being provided in the one profile half (12) for the flanges (13) of the chain (4) which are directed away from the slot (10), and a horizontal slot being provided between the slot (14) and the slot (10), the horizontal slot having top and bottom crosspieces on which chain rollers (15) can roll.

5. The apparatus as claimed in claim 4, wherein provided on the other profile half (16), which is located diametrically opposite the one profile half (12) guiding the chain (4), is a horizontal slot or a horizontal groove (17) for receiving and guiding free ends (18) of the chain studs (5).

6. The apparatus as claimed in claim 5, wherein a free space is provided between the other half (16) and the chain flanges (13) adjacent to and directed toward the other profile half (16), the carrying elements (19) being arranged in the free space when the carrying elements (19) have been pushed onto the chain studs (5).

7. The apparatus as claimed in claim 1, wherein the conveying rail (2) has grooves (7) in an outside wall for fastening the conveying rail (2) on carrying structures.

8. An overhead conveying apparatus adapted for items hanging on hooks, comprising:

a conveying chain (4);

the chain (4) being guided in a chain guide (3):

the chain (4) including chain studs (5) so that the chain studs (5) project laterally beyond chain flanges (13) disposed on one side of the chain (4);

plate-like carrying elements (19) being provided with holes (20) for receiving the chain studs (5) therethrough when the carrying elements (19) have been pushed onto the chain studs (5);

the carrying element (19) having a plate-like construction and being arranged one after the other on the chain (4);

the carrying elements (19) being provided with at least one opening (30) or one cutout (30) therethrough for accommodating a hook for the items;

the carrying elements (19) having two mutually opposite narrow edges (22, 23) to define a first narrow edge (22) and a second narrow edge (23); and the at least one opening (30) of the carrying element (19) being at least one rectangular transporting opening (30) disposed adjacent to the second narrow edge (23) and extending in direction of the first narrow edge (22) to extend approximately over half an extent of the carrying element (19).

9. The apparatus as claimed in claim 8, wherein, in each case, one coding section (31) is provided between the at least one opening (30) and the first narrow edge (22), the coding section (31) having coding means, the coding means including stuck-on numbers, a bar code and/or including coding means provided with electronic components which can be read in a contactless manner or by sensing contact.

10. The apparatus as claimed in claim 8, wherein the carrying elements (19) also have two mutually opposite longitudinal edges (24, 25).

11. The apparatus as claimed in claim 10, wherein the first narrow edge (22) extends to one longitudinal edge (24) along a slope (26) so that the first narrow edge (22) is approximately half a width of the second narrow edge (23), two of the holes (20) being arranged in a region of the first narrow edge (22), the two holes (20) having a spacing therebetween which corresponds to the stud (5) spacing of the chain (4) and, in a region of the longitudinal edges (24, 25), the carrying elements (19) each have a groove or recess (27, 28) so that the plate-like carrying elements (19) are tapered by approximately half in cross section, the recesses (27, 28) being provided in mutually opposite flat sides of the carrying elements (19).

12. The apparatus as claimed in claim 11, wherein, in an installed state, the plate-like carrying elements (19) hang on the chain studs (5) so that the carrying elements (19) are arranged one after the other in an interengaging or overlapping manner in a region of the recesses (27, 28).

13. The apparatus as claimed in claim 8, wherein the plate-like carrying elements (19) are of rectangular plate-like construction, the plate-like carrying elements (19) having four of the holes (20) therein for the chain studs (5) in a region of the first narrow edge (22), the plate-like elements (19), following one after the other on the chain studs (5), being spaced apart from one another in each case by the chain stud (5) spacing of the chain (4), and the carrying elements (19) having the openings (30) arranged to follow one after the other and, accordingly, being located one beside the other.

14. The apparatus as claimed in claim 8, wherein the holes (20) are provided in a region of the first narrow edge (22) so that the carrying element (19) can be pushed onto the projecting chain studs (5).

* * * * *